US009959735B2

(12) United States Patent  
Patil et al.

(10) Patent No.: US 9,959,735 B2  
(45) Date of Patent: May 1, 2018

(54) AIR QUALITY DETECTION MODULE

(71) Applicant: Honeywell International Inc., Morris Plains, NJ (US)

(72) Inventors: Swapnil Gopal Patil, Hyderabad (IN); Lakshma Reddy Dodda, Hyderabad (IN); Anjaiah Tumu, Hyderabad (IN); PhaniKumar Kagithapu, Hyderbad (IN); Veerender Sura, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days. days.

(21) Appl. No.: 15/494,206

(22) Filed: Apr. 21, 2017

(65) Prior Publication Data

US 2017/0323550 A1 Nov. 9, 2017

(30) Foreign Application Priority Data

May 4, 2016 (IN) .............................. 201611015525

(51) Int. Cl.
*G08B 21/00* (2006.01)
*G08B 21/14* (2006.01)
(Continued)

(52) U.S. Cl.
CPC .............. *G08B 21/14* (2013.01); *G08B 5/22* (2013.01); *H04M 1/72569* (2013.01); *H04W 76/02* (2013.01)

(58) Field of Classification Search
CPC combination set(s) only.
See application file for complete search history.

(56) References Cited

U.S. PATENT DOCUMENTS

2009/0309744 A1 12/2009 Fu et al.
2013/0174646 A1 7/2013 Martin
(Continued)

FOREIGN PATENT DOCUMENTS

CN 104237459 A 12/2014
CN 10476855 A 7/2015
(Continued)

OTHER PUBLICATIONS

European Patent Application No. 17167435.1, Extended European Search Report, dated Aug. 21, 2017, 9 pages.

*Primary Examiner* — Travis Hunnings
(74) *Attorney, Agent, or Firm* — Wick Phillips Gould & Martin LLP (57) ABSTRACT

Embodiments relate generally to systems and methods for detecting harmful substances in the ambient air around a user, such as particulate matter and toxic gases, and communicating this information to the user and other interested parties. In certain areas, the ambient air in a city or area may sometimes contain harmful gases and/or particulates. People may be encouraged to wear and/or carry certain PPE devices, such as masks, to protect themselves from the harmful substances in the air. However, a user may not always know when they are breathing in a harmful substance and should be wearing a mask. Also, a method may comprise activating an alarm to user to when environment is polluted, and alerting the user when to wear the respiratory mask. Additionally, a system may provide information on where a user may be able to obtain a mask or other PPE, based on the detected harmful substance.

20 Claims, 5 Drawing Sheets

(51) Int. Cl.
*G08B 5/22* (2006.01)
*H04M 1/725* (2006.01)
*H04W 76/02* (2009.01)

(56) References Cited

U.S. PATENT DOCUMENTS

2014/0031082 A1* 1/2014 Zishaan ................ G08B 21/12
　　　　　　　　　　　　　　　　　　　　　　455/556.1
2015/0330817 A1　11/2015 Law et al.

FOREIGN PATENT DOCUMENTS

| CN | 204520022 U | 8/2015 |
| EP | 3242278 A1 | 11/2017 |
| WO | 2015160830 A1 | 10/2015 |

* cited by examiner

AIR QUALITY DETECTION MODULE

CROSS-REFERENCE TO RELATED APPLICATIONS

The present application claims priority to India Provisional Patent Application Serial No. 201611015525 filed May 4, 2016 by Swapnil Gopal Patil, et al. and entitled "Air Quality Detection Module" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In certain areas, the ambient air in a city may sometimes contain harmful gases and/or particulates. People may be encouraged to wear and/or carry certain Personal Protection Equipment (PPE) devices, such as masks, to protect themselves from the harmful substances in the air.

SUMMARY

In an embodiment, a communication system may comprise a mobile device carried by a user; and an air quality module configured to be worn or carried by a user and configured to monitor characteristics of the air around the user, wherein the air quality module comprises a microcontroller; one or more sensors in fluid communication with the ambient air; and a wireless communication module configured to communicate data from the one or more sensors to the mobile device carried by the user, and wherein the mobile device is configured to receive and process the information received from the air quality module.

In an embodiment, a method for collecting information about the ambient air around a user may comprise establishing a wireless communication link between an air quality module and a mobile device; receiving sensed data from the air quality module; processing the sensed data; when an alarm is indicated by the received data, activating an alert for the user; establishing a wireless connection with a remote server; and forwarding the received data from the air quality module and processed information to the remote server.

In an embodiment, a method for receiving and processing information from one or more air quality modules may comprise establishing a wireless communication link between an air quality module and a mobile device; receiving sensed data from the air quality module; processing the sensed data, wherein the sensed data comprises at least one of pressure data, particulate data, gas data, humidity data, and temperature data; when an alarm is indicated by the received data, activating an alert for the user; determining, by the mobile device, that personal protection equipment (PPE) should be worn by the user based on harmful substances that indicated an alarm, by accessing a table of PPE associated with each of the harmful substances; generating a map comprising possible locations where the PPE may be obtained; displaying the map of the PPE locations on the display of the mobile device; establishing a wireless connection with a remote server; and forwarding the received data from the air quality module and processed information to the remote server.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for detecting harmful substances in the ambient air around a user and communicating this information to the user and other interested users. In certain areas, the ambient air in a city or workplace may sometimes contain harmful gases and/or particulates. People living and working in these areas may be encouraged to wear and/or carry certain PPE devices, such as masks, to protect themselves from the harmful substances in the air. However, a user may not always know when they are breathing in a harmful substance and should be wearing a mask. Particulate matter and toxic gases may be the air pollutants that most commonly affect people's health.

Particles in the air comprise multiple shapes and sizes, and can be solid particles or liquid droplets. Particles are typically divided into two groups that differ in many ways. Particulate matter (PM) that is 10 micrometers or less in diameter is called PM 10 and Particulate matter (PM) that is 2.5 micrometers or less in diameter is called PM 2.5. Both PM 10 and PM 2.5 particles can cause health problems, specifically respiratory health. Because of the smaller diameter, PM 2.5 particles may travel deeper into a person's lungs. Also, typically the PM 2.5 particles are made up of more toxic substances, like heavy metals and cancer causing organic compounds. Therefore, PM 2.5 can have worse health effects than the larger PM 10.

Exposure to particulate matter can lead to increased use of medication and more visits to the doctor or emergency room. Health effects include the following: coughing, wheezing, shortness of breath, aggravated asthma, lung damage (including decreased lung function and lifelong respiratory disease), and premature death in individuals with existing heart or lung diseases.

Some toxic chemicals released in the air such as benzene or vinyl chloride are highly toxic and can cause cancer, birth defects, long term injury to the lungs, as well as brain and nerve damage. And in some cases, breathing these chemicals can even cause death.

Embodiments of the disclosure relate generally to systems and methods for detecting harmful substances, such as particulate matter and toxic gases, present in the environment, activating an alarm to the user as to when the environment is polluted, and alerting the user when to wear the respiratory mask. Additionally, a system may provide information on where a user may be able to obtain a mask or other PPE, based on the detected harmful substance.

The proposed solution includes sensors, such as a particulate matter sensor (such as a PM 2.5 sensor) and gas sensors (such as a metal-oxide-semiconductor (MOS) sensor) located on a small printed circuit board (PCB) along with a wireless module (such as a Bluetooth Low Energy (BLE) module). All of these elements may be located on a wearable device which can pair with a mobile device application.

During a sensing mode of the air quality module, the gas sensor detects hazardous gases and the particulate sensor detects dust particles. If dust particles or hazardous gases are detected, this information may be communicated to the user through warning indications, where the user may be instructed to take appropriate actions, such as wearing a mask or other PPE. During a compliance management mode of the air quality module, data concerning dust particles and hazardous gases that have been detected by the module may be pushed to a cloud server (optionally through the mobile device application) for further analysis. Based on the analysis, the user may be informed of which PPE is needed to adequately protect the user from the detected harmful substance. Additionally, an application on the user's mobile device may be configured to provide quantitative and qualitative information to the wearer. Also, the data collected by the air quality module may be combined with other data from a plurality of air quality modules to generate graphs, charts, etc.

Figure 1:
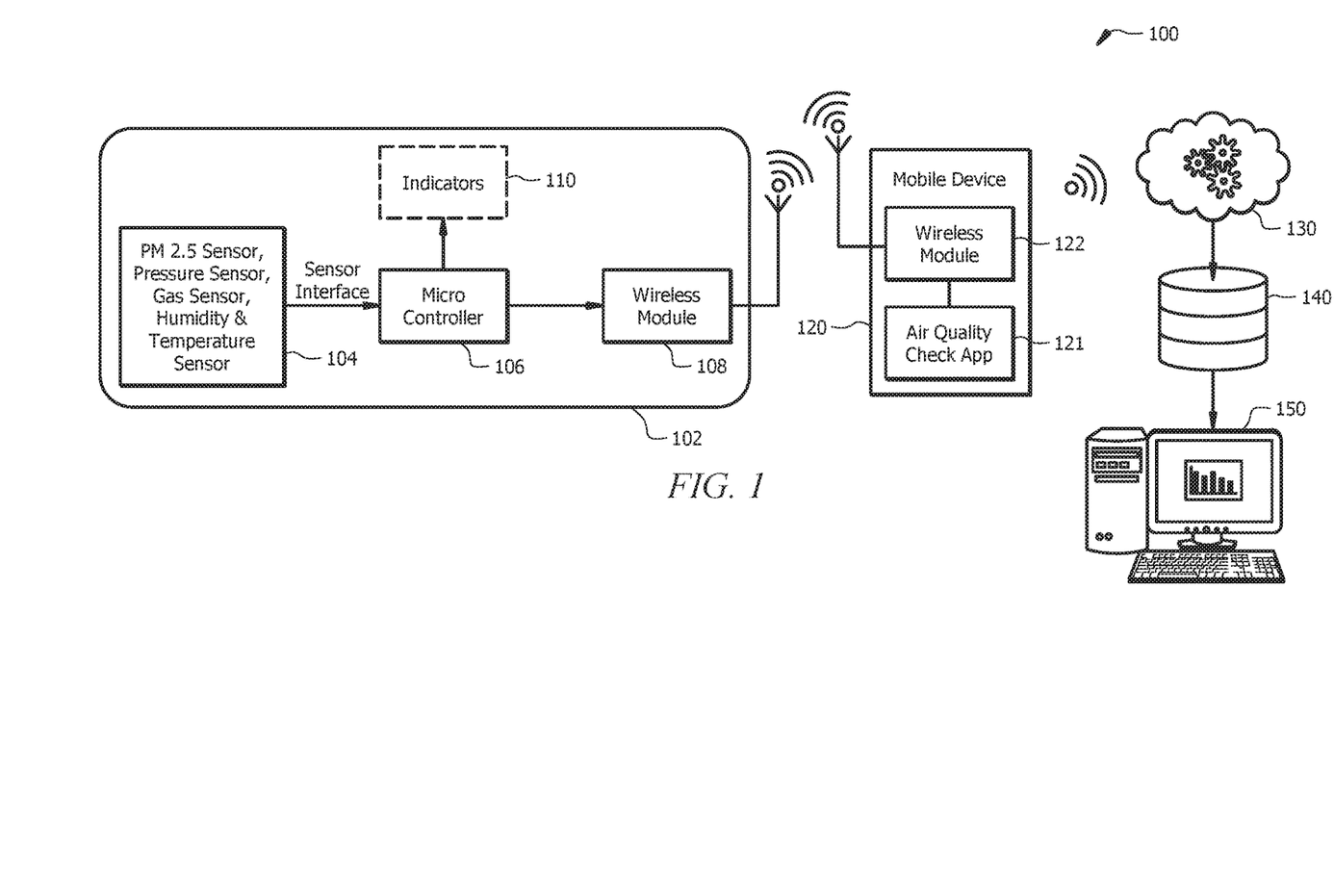
FIG. 1 illustrates a communication system according to an embodiment of the disclosure.

Referring now to FIG. 1, a communication system 100 is shown comprising an air quality module 102, wherein the air quality module 102 may be worn by a user. The air quality module 102 may comprise a plurality of sensors 104 configured to determine quality and characteristics of the air in the environment surrounding the user. The sensors 104 may include (but are not limited to) pressure sensor(s), gas sensor(s), and/or humidity sensor(s). In some embodiments, the air quality module 102 may comprise a pressure sensor 104 (which may comprise a metal-oxide-semiconductor (MOS) sensor and/or an absolute pressure sensor). The air quality module 102 may comprise a microcontroller (or MCU) 106 configured to receive and process data from the sensors 104. The microcontroller 106 may also be configured to communicate the received data via wireless communication, wherein the air quality module 102 may comprise a wireless module 108. In some embodiments, the wireless module 108 may comprise a Bluetooth module, Wi-Fi module, near-field communication (NFC) module, radio frequency (RF) module, or any other wireless communication module.

In some embodiments, the air quality module 102 may comprise (or may communicate with) one or more indicators 110. In some embodiments, the microcontroller 106 may process the information received from the sensors 104, and may activate an indicator 110, such as a light, buzzer, or beeper. For example, if the detected pressure levels are above or below predetermined thresholds, the microcontroller 106 may activate an indicator. In some embodiments, if the detected humidity levels are above or below predetermined thresholds, the microcontroller 106 may activate an indicator 110. In some embodiments, if the detected gas levels are above or below predetermined thresholds, the microcontroller 106 may activate an indicator 110. In some embodiments, the air quality module 102 may also comprise a power source, such as a battery.

In some embodiments, the air quality module 102 may be configured to communicate information to other devices in the communication system 100. For example, the air quality module 102 may be configured to wirelessly communicate with a mobile or handheld device 120, wherein the mobile device 120 may comprise a wireless module 122. The mobile device 120 may be carried by a user, and may comprise a smart phone, a tablet, a laptop, or other similar device. In some embodiments, the mobile device 120 may be configured to communicate information to a cloud storage 130, wherein the information may be processed and/or stored by the cloud storage 130. In some embodiments, the mobile device 120 may comprise an application 121 configured to receive, process, forward, and/or display information received from the air quality module 102.

In some embodiments, the air quality module 102 may be configured to wirelessly communicate with a wireless router or gateway, wherein the wireless gateway may forward the information received from the air quality module 102 to the cloud storage 130. In some embodiments, the information received from the air quality module 102 (either via the mobile device 120 and/or the wireless gateway) may be stored in a database 140 and/or forwarded or accessed by a remote monitoring station 150. In some embodiments, the information received from the air quality module 102 (as well as other air quality modules 102 worn by other users) may be compiled to generate graphs, charts, and other useful information about the air quality of an area. In some embodiments, other information collected by the mobile device 120 may be combined with the information received from the air quality module 102.

Figure 2:
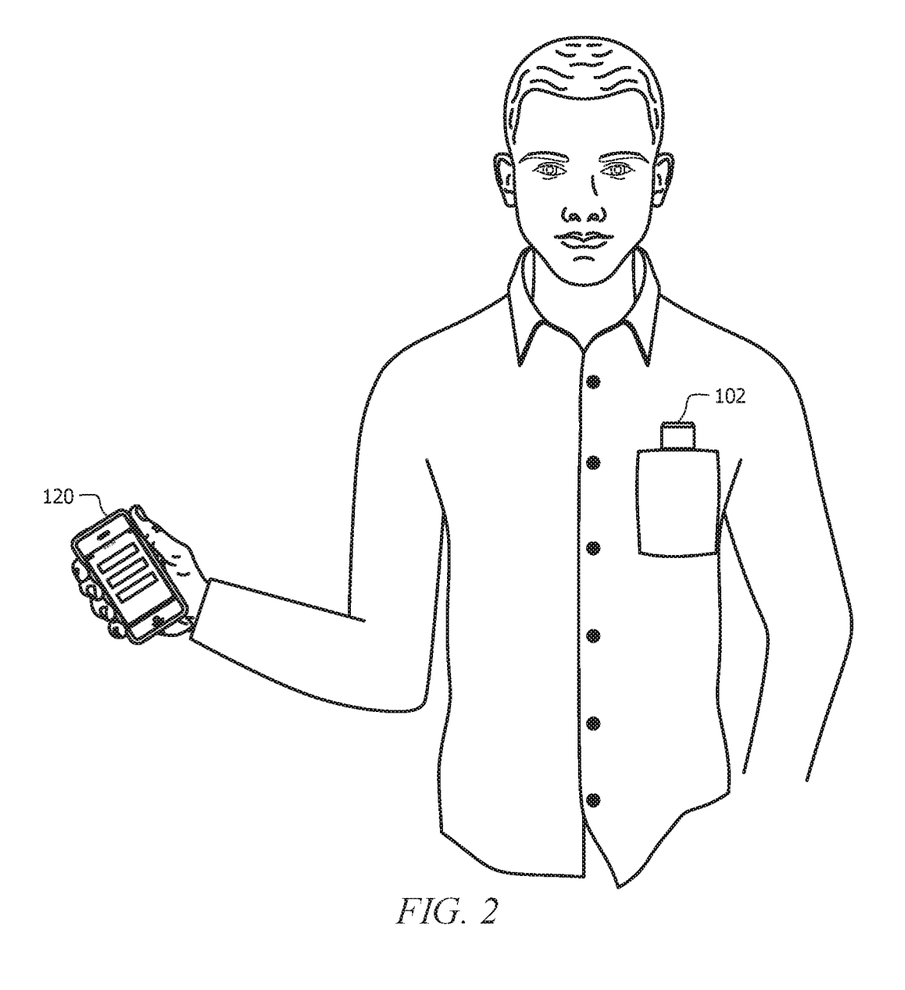
FIG. 2 illustrates an air quality module and mobile device as they may be worn and/or carried by a user according to an embodiment of the disclosure.

FIG. 2 illustrates a user wearing the air quality module 102 and carrying a mobile device 120, wherein the air quality module 102 may wirelessly communicate with the mobile device 120. In some embodiments, the air quality module 102 may comprise a clip or other attachment configured to attach the air quality module 102 to the user in some way. For example, the air quality module 102 may attach to a pocket, belt, loop, waist, etc. of a user's clothing.

Figure 3:
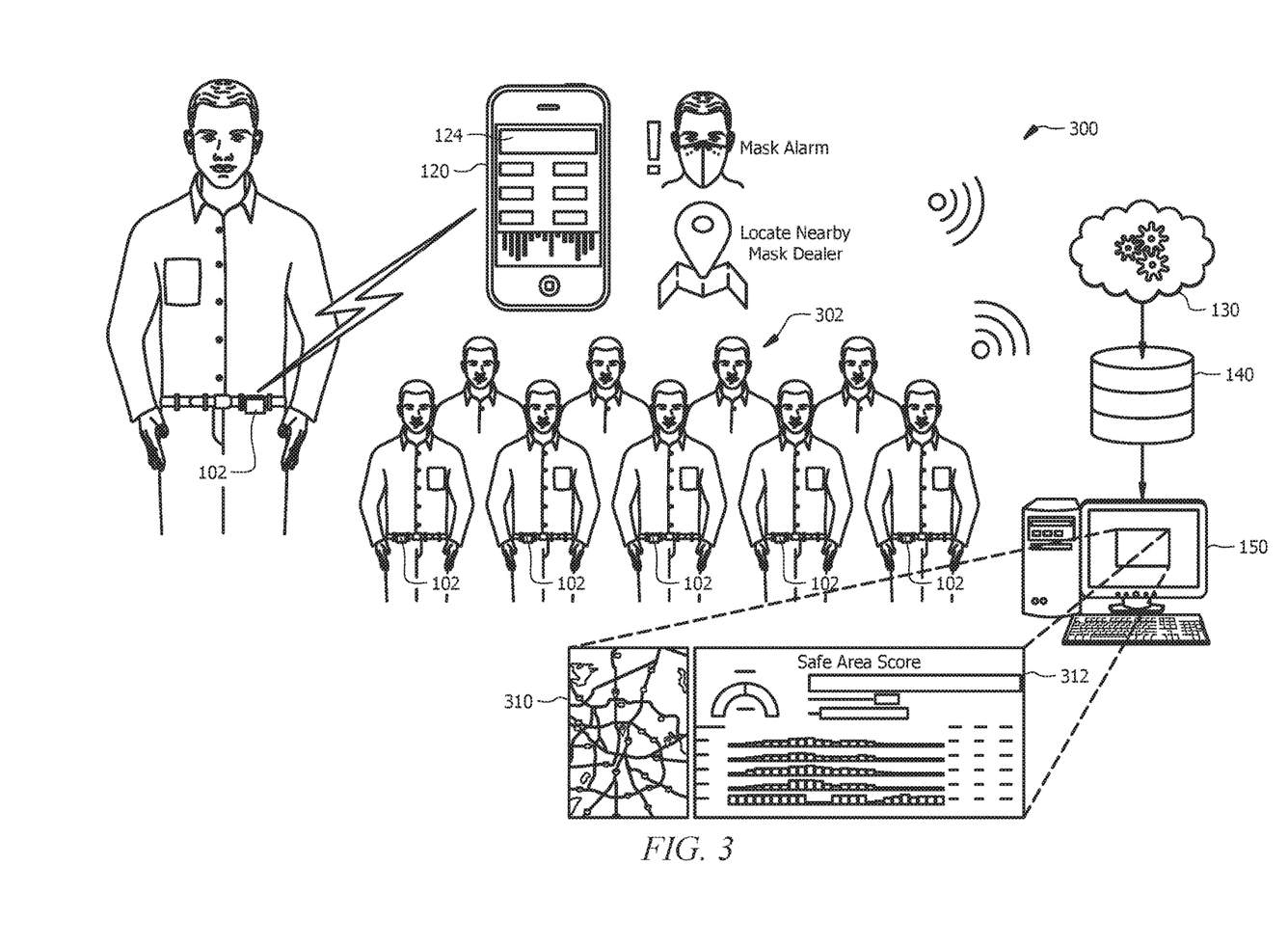
FIG. 3 illustrates another communication system according to an embodiment of the disclosure.

FIG. 3 illustrates another communication system 300. In some embodiments, when the air quality module 102 detects the presence of harmful air quality (such as particulates and/or gases), the mobile device 120 may recognize the detection of the harmful substance and generate a notification for the user. In some embodiments, the mobile device 120 may also use the display 124 to show the user what type of mask or other protection equipment they should wear to protect themselves from the detected harmful substance. Additionally, the mobile device 120 may use location data to generate a map of where a user may be able to purchase the needed mask or other protective equipment. This information may be associated with the detected substances, and may be stored locally on the mobile device 120 or may be accessed from a remote database.

In some embodiments, information from a group 302 of users wearing air quality modules 102 (including sensed data, location data, time data, etc.) may be gathered via the cloud storage 130, wherein the group information may be used to generate trends, graphs, and/or charts that indicate air quality information for a particular area. In some embodiments, the information may also be organized by time, to indicate the safest time of day to be in a particular area. In some embodiments, a graph 310 may be generated, showing the readings by location. In some embodiments, one or more charts 312 may be generated, showing the readings over time.

Figure 4A:
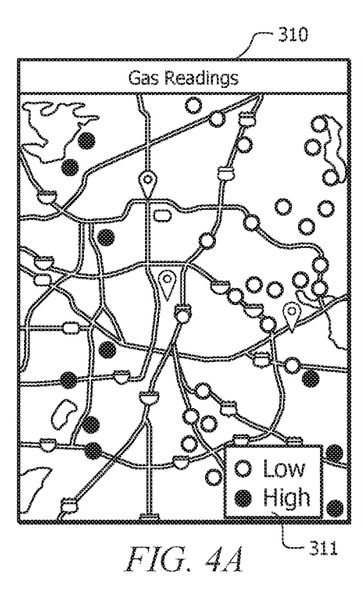
FIGS. 4A-4B illustrate generated graphs and charts according to an embodiment of the disclosure.
Figure 4B:
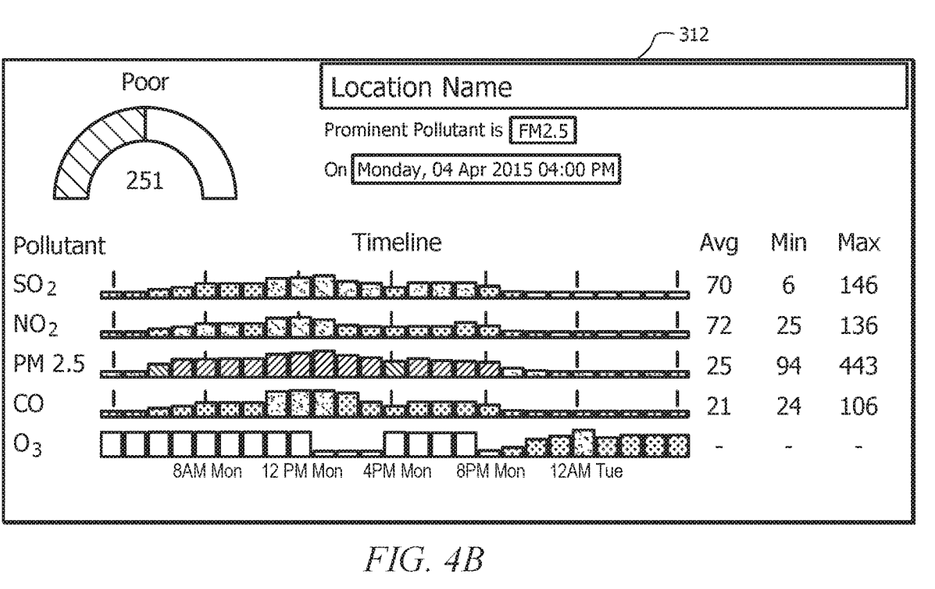

FIGS. 4A and 4B illustrate more detailed views of the graph 310 and chart 312 which may be generated from the data received from the plurality of air quality modules 102. The graph 310 may comprise indicators 311 showing the level of the gas reading at a specific location. In some embodiments, a plurality of levels may be indicated on the map using colors, patterns, sizes, shapes, etc. The chart 312 may comprise readings of the different gases, possibly including $SO_2$, $NO_2$, PM 2.5, CO, and $O_3$. The readings may be shown on a timeline, and averages, minimums, maximums, and other relevant information may be included on the chart 312.

Figure 5:
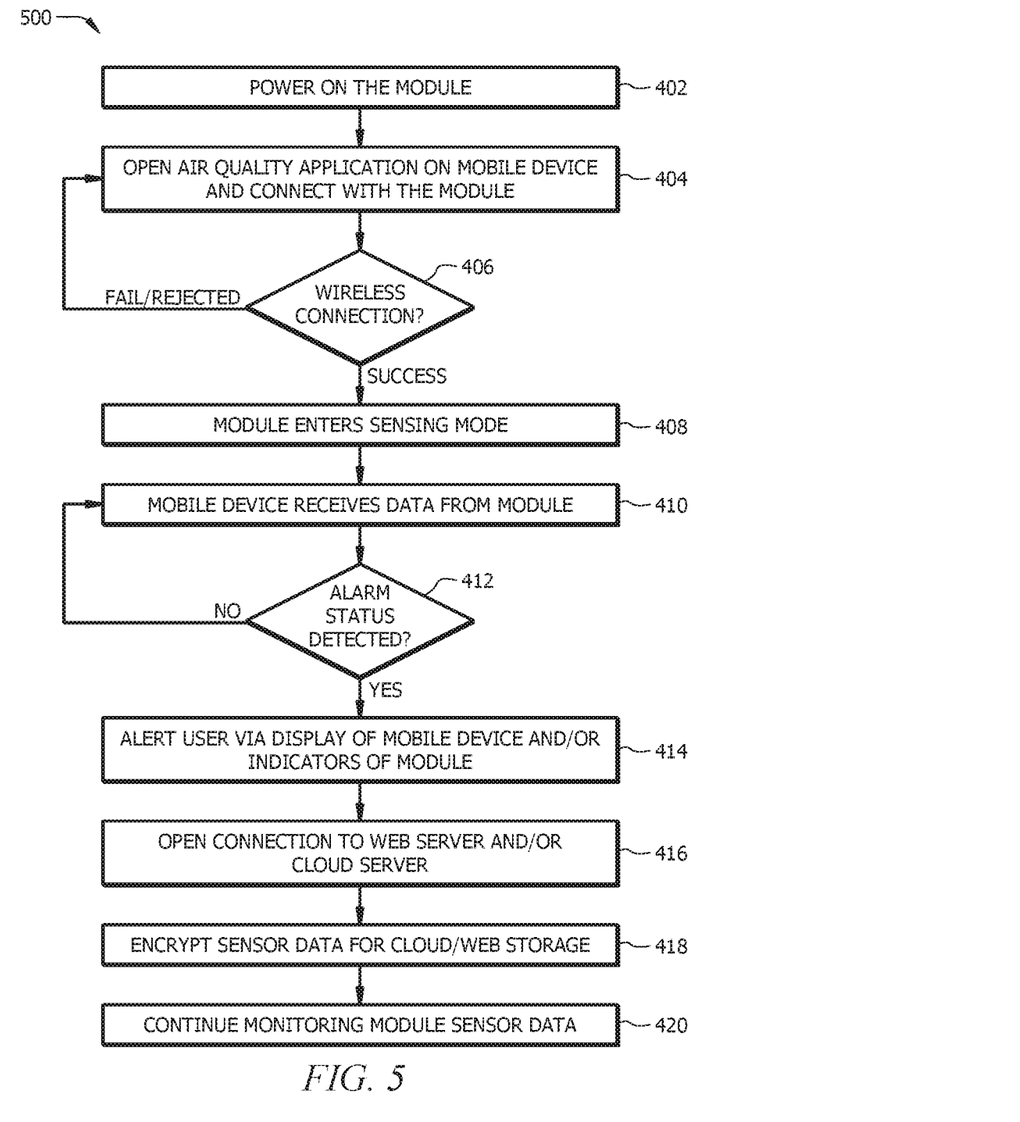
FIG. 5 illustrates a method according to an embodiment of the disclosure.

FIG. 5 illustrates an exemplary embodiment of a method 500 for receiving and processing information from one or more air quality modules 102 (shown above). At step 402, the module may be powered on by a user. At step 404, the user may open an air quality application on their mobile device and may connect the module to the mobile device. In some embodiments, the module and the mobile device may connect via a wireless connection. At step 406, the mobile device may verify that a wireless connection is made between the module and the mobile device. If a connection is not detected, the mobile device may repeat the initial connection step until a wireless connection is successful. When the wireless connection is successful, at step 408, the module may enter into a sensing mode. At step 410, the mobile device may receive sensed data from the module. At step 412, it may be determined if the module has indicated an alarm. When the module has not indicated an alarm, the mobile device may continue to receive data from the module for the duration of the wireless connection between the mobile device and module. When the module does indicate an alarm, at step 414, an alert may be generated by the mobile device and/or module. In some embodiments, the mobile device may generate an alert for the user via the display of the mobile device. In some embodiments, the module may generate an alert for the user via the indicators of the module. At step 416, the mobile device may establish a wireless connection with a remote server. In some embodiments, the server may comprise a cloud server. In some embodiments, the mobile device may only establish the connection with the remote server when an alert is detected from the module. In an alternative embodiment, the mobile device may establish the connection with the remote server at any time during the communication between the module and the mobile device. At step 418, the data from the module may be encrypted and stored in the remote server. At step 420, the mobile device may continue monitoring the data received from the module. In some embodiments, one or more steps of the method 500 may be repeated, may occur simultaneously, and/or may occur in a different order than shown and described in FIG. 5.

Embodiments of the disclosure may comprise a communication system comprising a mobile device carried by a user; an air quality module configured to be worn or carried by a user and configured to monitor characteristics of the air around the user, wherein the air quality module comprises a microcontroller; one or more sensors in fluid communication with the ambient air; and a wireless communication module configured to communicate data from the one or more sensors to the mobile device carried by the user, and wherein the mobile device is configured to receive and process the information received from the air quality module.

In some embodiments, the one or more sensors comprise a pressure sensor configured to monitor the air pressure of the ambient air. In some embodiments, the one or more sensors comprise a humidity sensor configured to monitor the humidity of the ambient air. In some embodiments, the one or more sensors comprise a gas sensor configured to monitor one or more gas levels of the ambient air. In some embodiments, the one or more sensors comprise a gas sensor configured to monitor one or more volatile organic compounds (VOCs) and/or hazardous gas levels within the ambient air. In some embodiments, the one or more sensors comprise a particulate sensor configured to monitor one or more particulate levels of the ambient air. In some embodiments, the particulate sensor comprises a sensor configured to detect particulate matter having a diameter of 2.5 micrometers or less. In some embodiments, the communication system may further comprise a processor configured to receive, process, and/or forward the information received from the sensors. In some embodiments, the air quality module further comprises one or more indicators, wherein the indicators are activated based on the received information from the sensors. In some embodiments, the air quality module is configured to wirelessly communicate with a remote monitoring station. In some embodiments, the wireless communication module comprises one or more of a Bluetooth module, Wi-Fi module, near-field communication (NFC) module, radio frequency (RF) module, or any other wireless communication module.

Embodiments of the disclosure may comprise a method for collecting information about the ambient air around a user comprising establishing a wireless communication link between an air quality module and a mobile device; receiving sensed data from the air quality module; processing the sensed data; when an alarm is indicated by the received data, activating an alert for the user; establishing a wireless connection with a remote server; and forwarding the received data from the air quality module and processed information to the remote server.

In some embodiments, the sensed data comprises at least one of pressure data, particulate data, gas data, humidity data, and temperature data. In some embodiments, the method may further comprise determining, by the mobile device, that personal protection equipment (PPE) should be worn by the user based on harmful substances that indicated an alarm, by accessing a table of PPE associated with each of the harmful substances; generating a map comprising possible locations where the PPE may be obtained; and displaying the map on the display of the mobile device.

In some embodiments, the table of PPE associated with the harmful substances is stored locally on the mobile device. In some embodiments, the table of PPE associated with the harmful substances is accessed from a remote database. In some embodiments, the method may further comprise receiving, by the remote server, data from a plurality of air quality modules and mobile devices, wherein the data comprises sensed readings and location information; and generating a map including the sensed reading and location information. In some embodiments, the alert comprises an indication on air quality module. In some embodiments, the alert comprises an indication on the display of the mobile device.

Embodiments of the disclosure may comprise a method for receiving and processing information from one or more air quality modules comprising establishing a wireless communication link between an air quality module and a mobile device; receiving sensed data from the air quality module; processing the sensed data, wherein the sensed data comprises at least one of pressure data, particulate data, gas data, humidity data, and temperature data; when an alarm is indicated by the received data, activating an alert for the user; determining, by the mobile device, that personal protection equipment (PPE) should be worn by the user based on harmful substances that indicated an alarm, by accessing a table of PPE associated with each of the harmful substances; generating a map comprising possible locations where the PPE may be obtained; displaying the map of the PPE locations on the display of the mobile device; establishing a wireless connection with a remote server; and forwarding the received data from the air quality module and processed information to the remote server.

Having described various devices and methods herein, exemplary embodiments or aspects can include, but are not limited to:

In a first embodiment, a communication system may comprise a mobile device carried by a user; and an air quality module configured to be worn or carried by a user and configured to monitor characteristics of the air around the user, wherein the air quality module comprises a microcontroller; one or more sensors in fluid communication with the ambient air; and a wireless communication module configured to communicate data from the one or more sensors to the mobile device carried by the user, and wherein the mobile device is configured to receive and process the information received from the air quality module.

A second embodiment can include the communication system of the first embodiment, wherein the one or more sensors comprise a pressure sensor configured to monitor the air pressure of the ambient air.

A third embodiment can include the communication system of the first or second embodiments, wherein the one or more sensors comprise a humidity sensor configured to monitor the humidity of the ambient air.

A fourth embodiment can include the communication system of any of the first to third embodiments, wherein the one or more sensors comprise a gas sensor configured to monitor one or more gas levels of the ambient air.

A fifth embodiment can include the communication system of any of the first to fourth embodiments, wherein the one or more sensors comprise a gas sensor configured to monitor one or more volatile organic compounds (VOCs) and/or hazardous gas levels within the ambient air.

A sixth embodiment can include the communication system of any of the first to fifth embodiments, wherein the one or more sensors comprise a particulate sensor configured to monitor one or more particulate levels of the ambient air.

A seventh embodiment can include the communication system of the sixth embodiment, wherein the particulate sensor comprises a sensor configured to detect particulate matter having a diameter of 2.5 micrometers or less.

An eighth embodiment can include the communication system of any of the first to seventh embodiments, further comprising a processor configured to receive, process, and/or forward the information received from the sensors.

A ninth embodiment can include the communication system of any of the first to seventh embodiments, wherein the air quality module further comprises one or more indicators, wherein the indicators are activated based on the received information from the sensors.

A tenth embodiment can include the communication system of the ninth embodiment, wherein the air quality module is configured to wirelessly communicate with a remote monitoring station.

An eleventh embodiment can include the communication system of the tenth embodiment, wherein the wireless communication module comprises one or more of a Bluetooth module, Wi-Fi module, near-field communication (NFC) module, radio frequency (RF) module, or any other wireless communication module.

In a twelfth embodiment, a method for collecting information about the ambient air around a user may comprise establishing a wireless communication link between an air quality module and a mobile device; receiving sensed data from the air quality module; processing the sensed data; when an alarm is indicated by the received data, activating an alert for the user; establishing a wireless connection with a remote server; and forwarding the received data from the air quality module and processed information to the remote server.

A thirteenth embodiment can include the method of the twelfth embodiment, wherein the sensed data comprises at least one of pressure data, particulate data, gas data, humidity data, and temperature data.

A fourteenth embodiment can include the method of the twelfth or thirteenth embodiments, further comprising determining, by the mobile device, that personal protection equipment (PPE) should be worn by the user based on harmful substances that indicated an alarm, by accessing a table of PPE associated with each of the harmful substances; generating a map comprising possible locations where the PPE may be obtained; and displaying the map on the display of the mobile device.

A fifteenth embodiment can include the method of the fourteenth embodiment, wherein the table of PPE associated with the harmful substances is stored locally on the mobile device.

A sixteenth embodiment can include the method of the fourteenth or fifteenth embodiments, wherein the table of PPE associated with the harmful substances is accessed from a remote database.

A seventeenth embodiment can include the method of any of the twelfth to sixteenth embodiments, further comprising receiving, by the remote server, data from a plurality of air quality modules and mobile devices, wherein the data comprises sensed readings and location information; and generating a map including the sensed reading and location information.

An eighteenth embodiment can include the method of any of the twelfth to seventeenth embodiments, wherein the alert comprises an indication on air quality module.

A nineteenth embodiment can include the method of any of the twelfth to eighteenth embodiments, wherein the alert comprises an indication on the display of the mobile device.

In a twentieth embodiment, a method for receiving and processing information from one or more air quality modules may comprise establishing a wireless communication link between an air quality module and a mobile device; receiving sensed data from the air quality module; processing the sensed data, wherein the sensed data comprises at least one of pressure data, particulate data, gas data, humidity data, and temperature data; when an alarm is indicated by the received data, activating an alert for the user; determining, by the mobile device, that personal protection equipment (PPE) should be worn by the user based on harmful substances that indicated an alarm, by accessing a table of PPE associated with each of the harmful substances; generating a map comprising possible locations where the PPE may be obtained; displaying the map of the PPE locations on the display of the mobile device; establishing a wireless connection with a remote server; and forwarding the received data from the air quality module and processed information to the remote server.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A communication system comprising:
   a mobile device carried by a user; and
   an air quality module configured to be worn or carried by a user and configured to monitor characteristics of the air around the user, wherein the air quality module comprises:
      a microcontroller;
      one or more sensors in fluid communication with the ambient air; and
      a wireless communication module configured to communicate data from the one or more sensors to the mobile device carried by the user, and wherein the mobile device is configured to receive and process the information received from the air quality module;
   wherein the mobile device is configured to determine that a personal protection equipment (PPE) should be worn by the user based on harmful substance that indicated an alarm, by accessing a table of PPE associated with each of the harmful substances;
   wherein the mobile device is also configured to generate a map comprising possible locations where the PPE may be obtained; and wherein the mobile device is also configured to display the map on a display of the mobile device.

2. The communication system of claim 1, wherein the one or more sensors comprise a pressure sensor configured to monitor the air pressure of the ambient air.

3. The communication system of claim 1, wherein the one or more sensors comprise a humidity sensor configured to monitor the humidity of the ambient air.

4. The communication system of claim 1, wherein the one or more sensors comprise a gas sensor configured to monitor one or more gas levels of the ambient air.

5. The communication system of claim 1, wherein the one or more sensors comprise a gas sensor configured to monitor one or more volatile organic compounds (VOCs) and/or hazardous gas levels within the ambient air.

6. The communication system of claim 1, wherein the one or more sensors comprise a particulate sensor configured to monitor one or more particulate levels of the ambient air.

7. The communication system of claim 6, wherein the particulate sensor comprises a sensor configured to detect particulate matter having a diameter of 2.5 micrometers or less.

8. The communication system of claim 1, further comprising a processor configured to receive, process, and/or forward the information received from the sensors.

9. The communication system of claim 1, wherein the air quality module further comprises one or more indicators, wherein the indicators are activated based on the received information from the sensors.

10. The communication system of claim 1, wherein air quality module is configured to wirelessly communicate with a remote monitoring station.

11. The communication system of claim 1, wherein the wireless communication module comprises one or more of a Bluetooth module, Wi-Fi module, near-field communication (NFC) module, radio frequency (RF) module, or any other wireless communication module.

12. A method for collecting information about the ambient air around a user comprising:
   establishing a wireless communication link between an air quality module and a mobile device;
   receiving sensed data from the air quality module;
   processing the sensed data;
   when an alarm is indicated by the received data, activating an alert for the user;
   establishing a wireless connection with a remote server;
   forwarding the received data from the air quality module and processed information to the remote server;
   determining, by the mobile device, that a personal protection equipment (PPE) should be worn by the user based on harmful substance that indicated an alarm, by accessing a table of PPE associated with each of the harmful substances;
   generating a map comprising possible locations where the PPE may be obtained; and
   displaying the map on a display of the mobile device.

13. The method of claim 12, wherein the sensed data comprises at least one of pressure data, particulate data, gas data, humidity data, and temperature data.

14. The method of claim 12, wherein the table of PPE associated with the harmful substances is stored locally on the mobile device.

15. The method of claim 12, wherein the table of PPE associated with the harmful substances is accessed from a remote database.

16. The method of claim 12, further comprising:
   receiving, by the remote server, data from a plurality of air quality modules and mobile device, wherein the data comprises sensed readings and location information; and
   generating a map including the sensed reading and location information.

17. The method of claim 12, wherein the alert comprises an indication on air quality module.

18. The method of claim 12, wherein the alert comprises an indication on the display of the mobile device.

19. A method for receiving and processing information from one or more air quality modules comprising:
   establishing a wireless communication link between an air quality module and a mobile device;
   receiving sensed data from the air quality module;
   processing the sensed data, wherein the sensed data comprises at least one of pressure data, particulate data, gas data, humidity data, and temperature data;
   when an alarm is indicated by the received data, activating an alert for the user;
   determining, by the mobile device, that a personal protection equipment (PPE) should be worn by the user based on harmful substance that indicated an alarm, by accessing a table of PPE associated with each of the harmful substances;
   generating a map comprising possible locations where the PPE may be obtained;
   displaying the map of the PPE locations on the display of the mobile device;
   establishing a wireless connection with a remote server; and
   forwarding the received data from the air quality module and processed information to the remote server.

20. The communication system of claim 1, wherein the table of PPE associated with the harmful substances is stored locally on the mobile device.

* * * * *

UNITED STATES PATENT AND TRADEMARK OFFICE
CERTIFICATE OF CORRECTION

PATENT NO. : 9,959,735 B2
APPLICATION NO. : 15/494206
DATED : May 1, 2018
INVENTOR(S) : Swapnil Gopal Patil et al.

Page 1 of 1

It is certified that error appears in the above-identified patent and that said Letters Patent is hereby corrected as shown below:

On the Title Page

Item (74), Column 2, Line 2: insert --,-- after "Martin"

In the Claims

Column 10, Line 62: Claim 1 "substance" should be "substances"

Column 11, Line 30: Claim 10 insert --the-- after "wherein"

Column 11, Line 51: Claim 12 "substance" should be "substances"

Column 12, Line 15: Claim 16 "device" should be "devices"

Column 12, Line 37: Claim 19 "substance" should be "substances"

Signed and Sealed this
Twenty-eighth Day of August, 2018

Andrei Iancu
*Director of the United States Patent and Trademark Office*